Sept. 27, 1966 E. F. MAYER 3,275,436

METHOD OF IMAGE REPRODUCTION UTILIZING A UNIFORM RELEASABLE SURFACE FILM

Filed July 24, 1962 3 Sheets-Sheet 1

INVENTOR.
EDWARD F. MAYER

BY Stanley Z. Cole

ATTORNEY

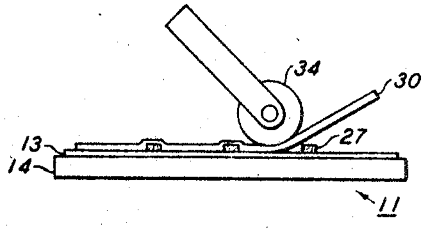
FIG. 2
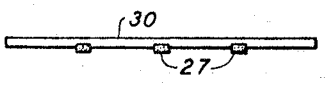
FIG. 3
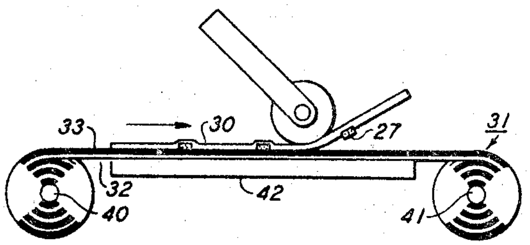
FIG. 4
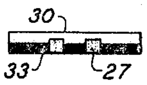
FIG. 5B
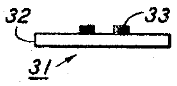
FIG. 6B
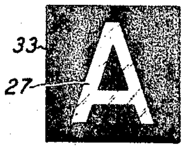
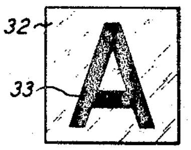
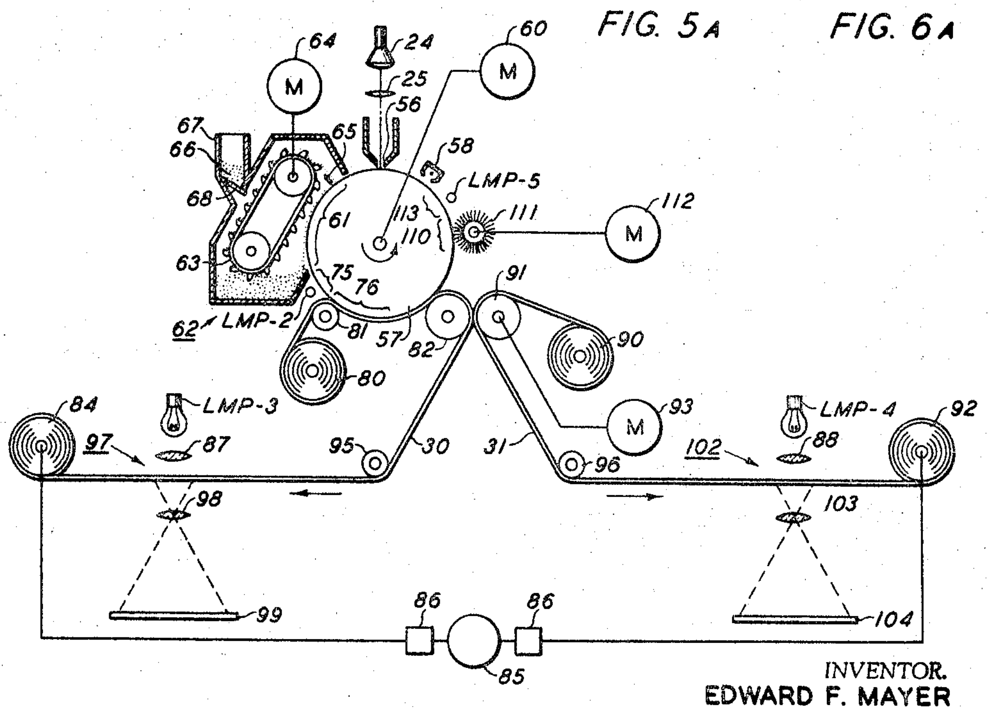
FIG. 5A FIG. 6A FIG. 7
INVENTOR.
EDWARD F. MAYER
BY Stanley Z. Cole
ATTORNEY INVENTOR.
EDWARD F. MAYER
BY
Stanley Z. Cole
ATTORNEY United States Patent Office 3,275,436

Patented Sept. 27, 1966

3,275,436

METHOD OF IMAGE REPRODUCTION UTILIZING A UNIFORM RELEASABLE SURFACE FILM

Edward F. Mayer, Novelty, Ohio, assignor to Xerox Corporation, Rochester, N.Y., a corporation of New York Filed July 24, 1962, Ser. No. 212,083

16 Claims. (Cl. 96—1)

This invention relates to novel method and apparatus of image reproduction.

With an ever increasing yield of information of various forms, there has arisen concomitant need for improvements in recording the information. Thus many purposes exists for which it may be desired that original information be reproduced as, for example, to effect wide dissemination, to effect permanent records of otherwise passing information, to effect size reduction for storage purposes, etc. In other instances, it is desired to transpose information into more useful form. Thus original intelligence or information which is transmitted in the form of electrical signals or the like may be impossible to comprehend unless recorded for subsequent analysis.

It has long been desired that a reproduction system be available that would accord flexibility in the ultimate reproduction form and, at the same time, offer the versatility of controlled fidelity, wide latitudes of sensitivity and yet be compatible for either high or low speed information output systems. For example, one of the more rapid electronic methods of producing alphabetical and numerical symbols or characters involves the use of a shaped beam cathode ray tube. In such a device, the character is created on the tube face by projecting an electron beam through a very small aperture of a desired pattern. Generally the tube face is relatively small and the light intensity at the face is relatively low. These factors limit direct visual display as well as large scale presentations of the information produced. To create this information in more valuable form, a recording system having broad capabilities of speed, sensitivity and fidelity becomes a highly desired device. When considering military purposes, it is frequently desirable to project information in negative form in order that information received from a plurality of different sources can be quickly and readily compared side by side or in an overlap relationship. It is usually a requirement for such applications that the transparencies be of high resolution. It is also a usual requirement that the copy be formable at a high rate of speed consistent with the output rate of the information source. When such a reproduction rate is possible, lag is prevented and a need to store incoming material is dispensed with.

It is therefore an object of the invention to provide novel method and apparatus for the recording or production of information.

It is a further object of the invention to provide novel method and apparatus for the formation of either negative and/or positive image reproductions.

It is a still further object of the invention to provide novel method and apparatus for the simultaneous formation of complementary negative and positive image reproductions.

It is a still further object of the invention to provide novel method and apparatus for forming high density, low contrast reproductions from relatively low density, low contrast original images.

It is a still further object of the invention to provide novel method and apparatus for rapid transformation of information intelligence into high resolution reproduction expediently and relatively inexpensive as compared to known methods of prior art.

Additional objects of this invention will in part be obvious and will in part become apparent from the following specification and drawings in which:

FIG. 2 illustrates transfer of image to a support base;

Figure 8:
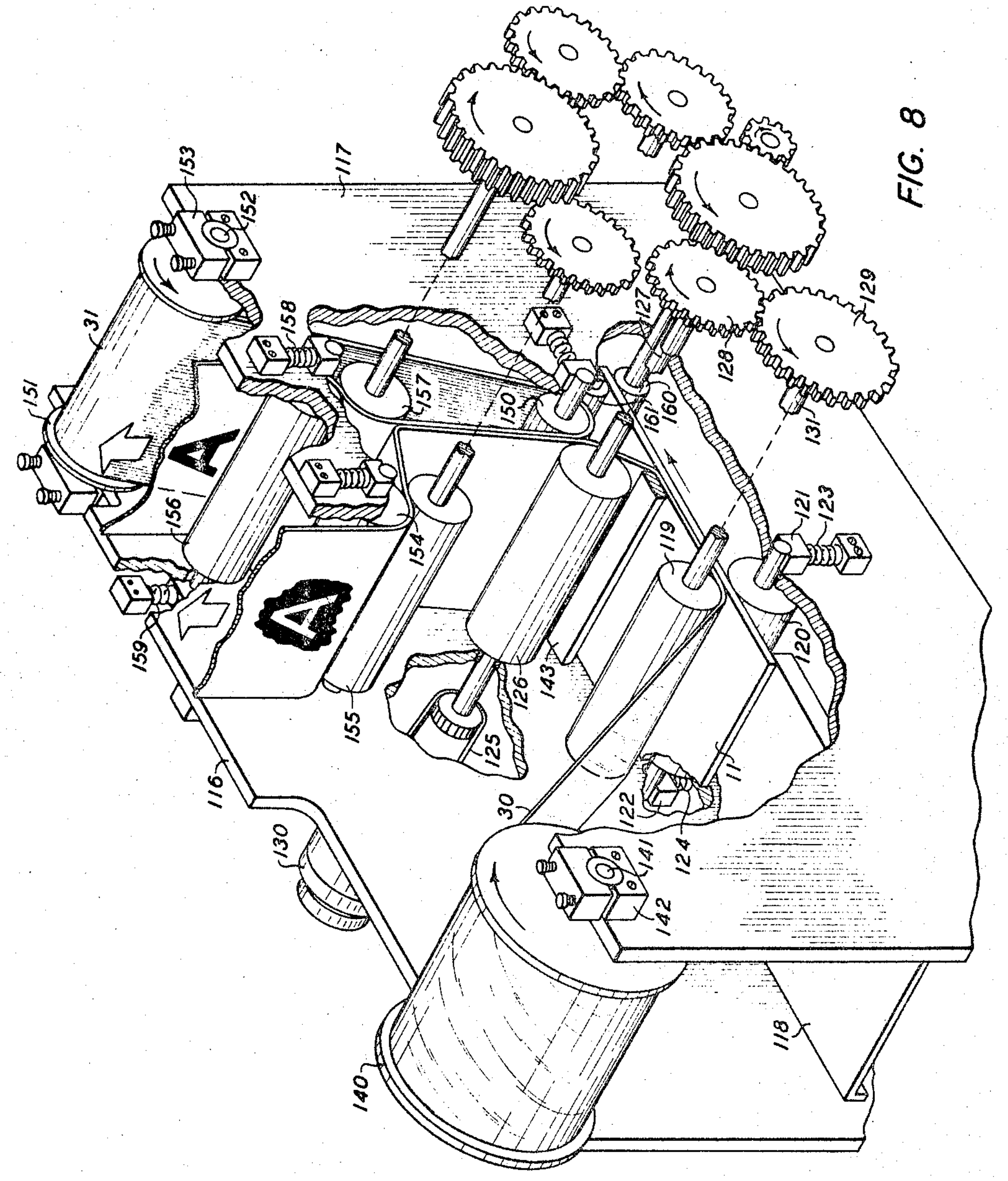

FIG. 3 diagrammatically illustrates the support base bearing an image;

FIG. 4 illustrates the application of the support base bearing the image against a second support base having a releasable donor film;

FIGS. 5*a* and 5*b* illustrate the resulting formation in section and plan respectively on the first support base after being stripped apart from the second support base in the relation of FIG. 4;

FIGS. 6*a* and 6*b* illustrate the second support base in section and plan respectively after being stripped apart from the relation of FIG. 4;

FIG. 7 schematically illustrates an apparatus for continuous operation of forming image projection transparencies in accordance with the method of the invention; and, FIG. 8 is a partially exploded isometric view of apparatus for processing flat xerographic plates seriatim in accordance with the invention.

Figure 1:
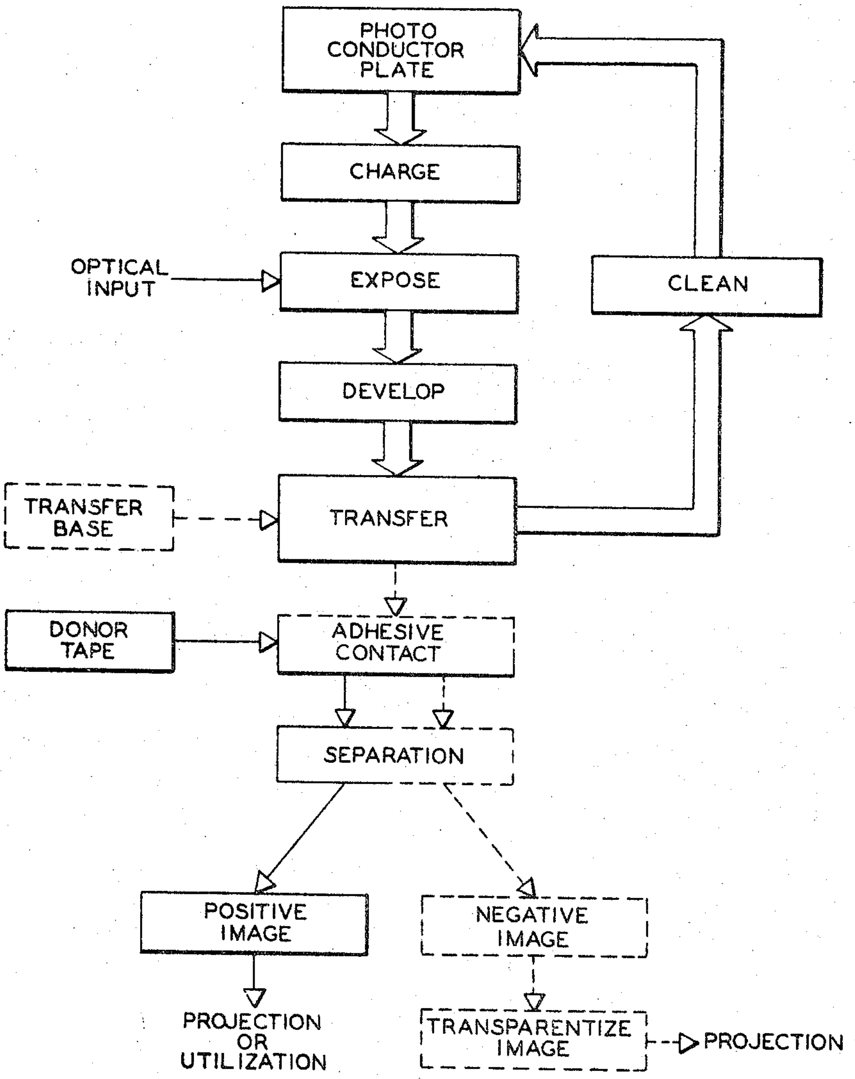
FIG. 1 is a process flow diagram of an embodiment in accordance with the invention.

For a general understanding of this invention, reference is now had to FIG. 1 wherein the sequential flow steps in accordance with one embodiment are illustrated. The particular technique described uses xerography as, for example, disclosed in Carlson Patent 2,297,691, to form a powder image corresponding to copy being reproduced. However, there is no intention to limit this invention to operation only with xerography. As will be understood, an image is utilized as a resist and is employed in a subsequent transfer step so that any graphic image formed by whatever means, including any of electrical, mechanical or chemical techniques such as photography, electrography, electrophotography, conventional forms of printing, stenciling or the like, otherwise suitable are intended to be encompassed herein. In order to simplify the presentation of this invention and its understanding, it will be described in terms of xerography.

The reproductions will be described as "complementary" and as being "positive" and "negative" as used in the conventional photographic sense. As will be understood as used herein, the terms can be interchangeably applied to different image formations depending upon characteristics of employed material as well as the image.

In the embodiment of the invention being described, there is employed a xerographic plate having a suitable photoconductive insulating layer overlying a conductive backing member. The photoconductive insulating layer may be any of a number of materials as, for example, sulphur, vitreous or amorphous selenium, zinc oxide in a resin binder, or other insulating binder films bearing photoactive pigments or the like. The backing may comprise metal such as aluminum, brass or the like or may comprise paper or the like. The plates may be overcoated with organic or inorganic materials as, for example, disclosed in Owens Patent U.S. 2,886,434. Functionally, the photoconductive layer may be described as a material able to retain electrostatic charge for a sufficiently long period to allow exposure and development of electrostatic charges on a surface and as a material which on exposure to activating radiation rapidly dissipates charge. The plate may also comprise a chemographic layer and images may be produced using chemographic techniques. For a fuller disclosure of such layers and how they are used, reference is made to pending application, Serial No. 682,980, filed September 9, 1957, now U.S. Pat. No. 3,081,165, in the name of Ebert.

Employing xerography, the plate is first charged to a uniform potential on the order of 100 to 800 volts as by well known forms of corona discharge or other charging devices. Charging may be of either polarity, the particular polarity depending on the layer being charged and is carried out in the absence of radiation to which a plate is sensitive.

After charging, the plate is exposed from an optical input representative of the image to be reproduced. Exposure causes dissipation of the charge in those areas struck by light resulting in a charge pattern of electrostatic charge corresponding to the optical input on the surface of the photoconductive insulating layer. It should of course be appreciated that other known techniques of forming a charge pattern are known and are intended to be encompassed by this invention.

Development of the electrostatic charge is generally used to render the charge pattern visible and may be accomplished by any of the methods well known in the art. Thus, one may readily employ cascade development, brush development, magnetic development, powder cloud development, liquid development and the like. Numerous patents and other publications exist describing these and other developing systems which are readily usable in this invention and this will become more apparent as the description proceeds. It is noted at this point that the deposited marking material in accordance with certain embodiments of this invention need not include coloring material as is usually the case with xerographic developers.

The transfer and related blocks of FIG. 1 are more fully illustrated in FIG. 2. There is illustrated in this figure transfer of a powder image from a xerographic plate, generally designated 11 and comprising a photoconductive insulating layer 13 on a conductive backing 14. It should be appreciated, however, that the image need not be in powder form. It could comprise a film or the like but for simplicity, the image will be discussed as a powder particle image. As illustrated, there is employed a web support base 30, which may be opaque, translucent or transparent depending on the ultimate use of the base. The web comprises a material at least having a surface either capable of being rendered tacky as by the application of heat, solvents, or the like with or without accompanying pressures or having a surface which is tacky such as an adhesively coated surface such as an adhesive or the like type tape. The web is applied with the adhesive surface (or with the surface while in an adhesive condition) against the powder image on the plate as by means of a roller 34. For the purposes of illustration, dimensional proportions are shown exaggerated. The toner, however, does become embedded or otherwise held in the tape surface. After application, the tape is removed and carries the powder image from the plate producing the article shown in FIG. 3 with powder image 27 adhering in image formation to the surface of tape 30.

Next subsequent, the article thus produced is placed, as illustrated in FIG. 4 (FIG. 1, Adhesive Contact Block) against a second web support base designated 31 and formed of a donor support backing 32, which may be opaque, translucent or transparent as will be understood, and on which is supported a releasable donor layer or film 33 as will be described. The donor material may conveniently be stored on a supply roll 40 and drawn onto a take-up roll 41 between which is a support platen 42. In accordance with FIG. 4, the base 30 bearing the powder image 27 is pressed firmly against the opaque donor film 33 on base 32 then over platen 42 as by a roller 43. In this position, web 30 should be tacky. This may be brought about by employing a material as web 30 which is naturally tacky or a material which is rendered tacky without affecting the donor film. It should also be appreciated that a nontacky web may be employed if a tacky donor film or layer 33 is used. In this instance, the image should, itself, create adhesive areas so that substantially an adhesive contact is formed only between the nonimage supporting areas of web 30 and the donor film. After the two webs attain an adhesive grip, they are stripped apart (FIG. 1, Separation) to produce the two separate complementary articles illustrated in FIGS. 5 and 6 and illustrated as blocks in FIG. 1 bearing the legend "positive" and "negative."

As may be seen in FIGS. 5 and 6, there is shown for illustrative purposes a letter A in complementary fashion. Thus the surface of web 30 is now completely covered by the combination of toner 27 in image configuration and donor film 33 in the remaining areas. With a proper choice of materials including a transparent toner 27 and an opaque donor film or layer 33, the article of FIG. 5 could constitute a negative image projection transparency with the image areas represented by the letter A being substantially clear and light transmitting. The light transmitting properties of the image can be enhanced to become increasingly transparent where required, i.e., the light scattering properties of unpigmented toner can be reduced by fusing by such means as heat or vapor or by coating the image with a material having a similar index of refraction, as a liquid or other encapsulating tape or by such other means known in the art.

Illustrated in FIG. 6, on the other hand, is the complementary article illustrated in FIG. 5. Likewise, with a proper choice of materials, including transparent base 32, and an opaque donor film 33, the article of FIG. 6 comprises a positive image transparency of the same letter A and includes the remaining donor film supported on a support base 32 following selective transfer. As described, there is simultaneously formed in accordance with this invention a complementary positive and negative image either or both of which may be opaque or transparent depending upon the preselection of materials as described.

Referring now to FIG. 7, there is illustrated schematically an automatic apparatus in accordance with the invention. The xerographic apparatus described herein may be an adaptation of the type disclosed in copending application, Serial No. 837,173, filed August 31, 1959, in the names of A. J. Cerasani et al., now U.S. Patent 3,076,392.

As here shown, a cathode ray tube 24 or any other suitable form of optical input is adapted to project an optical image through an objective lens 25 downwardly through a variable slit aperture assembly 56 and onto the surface of a xerographic plate in the form of drum 57. Where required, provision may be made to effect magnification change between the input and recorded image.

Xerographic drum 57 includes a cylindrical member mounted in suitable bearings in the frame of the machine and it is driven in a counterclockwise direction by motor 60 at a constant rate proportional to the movement rate of the original copy, whereby the peripheral rate of the drum surface is identical to the rate of movement of the projected light image. The drum surface being similar to plate 11 described above comprises a photoconductive material on a conductive backing that is sensitized prior to exposure by means of a corona generating device 58 energized from a suitable high potential source.

Exposure of the drum to the light image discharges the photoconductive layer in the areas struck by light, whereby there remains on the drum a latent electrostatic image in image configuration corresponding to the light image projected from the source of optical input. As the drum surface continues its movement, the electrostatic latent image passes to a developing station 61 at which a two-component developing material 62, which may be of a type disclosed in Patents 2,618,552; 2,638,416 or Reissue 25,136, is cascaded over the drum surface by means of a developing apparatus 62 which may be of a type disclosed in copending application, Serial No. 393,058, filed November 19, 1953, in the names of C. R. Mayo et al. is cascaded across the drum for development.

In the developing apparatus, developing material is carried by conveyor 63 driven by suitable drive means from a motor 64 and is released onto chute 65 and cascaded down over the drum surface. Since the toner component of the developer is partially consumed in developing, additional toner 66 is stored in the dispenser 67 and is released in amounts controlled by gate 68 to the developer to replenish and assure uniform development. Component 65 may also comprise an air knife to effect greater impetus to fine component developer.

After developing, the drum passes a discharge station 75 at which the drum surface is illuminated by a lamp LMP–2 to discharge residual charges on the nonimage areas of the drum surface. Thereafter, the powder image passes to an image transfer station 76 at which the powder image is in this embodiment adhesively transferred to a continuous support surface web 30 drawn from a supply roll 80 over guide roll 81 into contact against the drum surface. The web is then directed over guide roll 82 and is stripped away from the drum surface with the powder image adhering thereto. At the same time, the web advances into pressure engagement against web 31 drawn from supply roll 90 and passing over a guide roll 91.

In passing over guide roll 82, web 30, now containing the image adhesively transferred from the drum, is caused to be applied against web 31 drawn from supply roll 90. Thereafter, webs 30 and 31 are separated to effect an identical result as described in connection with FIG. 4 above. In order to ensure synchronous movement between guide roll 82 and guide roll 91, either or both may be driven from a motor 93. After separation, web 30 comprises one form of image as a negative image projection transparency which advances from guide roll 82 to guide roll 95. Beyond guide roll 95, the web may optionally move past a projection system 97 having a condensing lens 87, an objective lens 98 and a lamp LMP–3 to project the image onto a projection screen 99, and then onto takeup roll 84 being driven by motor 85 under control of slip clutch 86. The slip clutch arrangement 86 serves to ensure that the linear rate of web movement remains substantially constant as the diameter of takeup roll 84 increases. Similarly, web 31 formed an opposite complementary image and may, if desired, form a positive image projection transparency which advances over guide roll 91 to guide roll 96. Optionally, it may similarly move past a projection system 102 having a condenser lens 88 and an objective lens 103 and a lamp LMP–4 to project the image onto a projection screen 104 and then onto take-up roll 92 being driven also by motor 85 under control of a similar slip clutch 86. Otherwise, the web may be directed to storage or the like for permanent recording purposes.

Speeds at which the mechanism of FIG. 7 can be made to operate will vary depending on such factors as rate of optical input, material properties limitations, desired resolution, etc Operational speeds on the order of 10–20 inches per second have been found to be completely compatible with the invention such that original data is made available for utilization within about 1.5 to 4 seconds after the exposure step.

After separation of transfer web 30 from the drum, the drum surface passes through cleaning station 110 at which the surface is brushed by a cleaning brush assembly 111 rotated by a motor 112. This accomplishes removal of the residual developing material remaining on the drum. The drum surface then passes through a second discharge station 113 at which it is illuminated by a fluorescent lamp LMP–5 to remove any electrostatic charge on the drum. Suitable light traps are provided in the apparatus to prevent any light rays from reaching the light surface, other than the projected image, during the period of drum travel prior to sensitization by corona generating device 58 until after the drum surface is completely passed through the developing station 61.

Referring now to FIG. 8, there is illustrated apparatus for automatically processing flat xerographic plates containing a powder image which may have been formed from a still or substantially still exposure. A pair of parallel castings 116 and 117 provide the primary support. A plate 11 is first placed on a platen 118 from where it can conveniently be manually inserted into the bite of a pair of driven feed rolls 119 and 120 into pressure engagement against the adhesive surface of a web 30. Both feed rolls are supported for rotation with the lower roll 120 being supported between a pair of spring-mounted blocks 121 and 122 that are urged upward by a pair of springs 123 and 124 whereby a plate may be passed between the rolls under application of a substantially controlled pressure against the web. The top roll 119 is driven by motor 130, which through a timing belt and pulley arrangement 125 drives guide roll 126 having an axle 127 to which is secured gear 128 meshing with a gear 129 secured to axle 131 supporting feed roll 119.

The web 30 is adapted to pass in contact against a powder image supported on the plate and is drawn from a supply roll 140 suitably mounted for rotation about axle 141 and having a drag brake 142 connected to the roll to maintain tautness in the web being drawn. The web passes under feed roll 119 with its adhesive face in this embodiment against the powder image on plate 11 to be transferred and both the web and plate advance synchronously and in unison between the feed rolls.

The web and plate advance in unison until reaching the vicinity of a stationary supported stripper bar 143 whereat the web is stripped substantially tangentially from the plate along the forward edge of the bar. The web 30 is then caused to pass upward through a pair of guide rolls 126 and 150, the former of which is driven and both being supported similarly as rolls 119 and 120 having a controlled pressure application by means of springs 158 and 159 and wherebetween the web 30 comes into face-to-face contact with the releasable opaque donor film on web 31.

The web 31 is contained on a supply roll 151 mounted for rotation on an axle 152 and to which is secured an adjustable drag brake 153 in order to maintain tautness in the web 31 being drawn. On being drawn from the supply roll, the web is caused to be wound about guide roll 150 into face-to-face contact against the web 30 containing the transferred powder image. On passing between guide rolls 126 and 150, both webs come into physical pressure contact uniformly against each other such that the adhesive surface contained on web 30 is firmly pressed against the releasable donor film contained on web 31. The webs continue to advance through the guide rolls until approaching a pair of separating guide rolls 154 and 155 and 156 and 157 that cause the two intimately positioned webs to be separately directed and be stripped apart. Each of the latter guide rolls are mounted for rotation with web 30 being guided through the bite of feed rolls 154 and 155, while web 31 is caused to pass and emerge from between guide rolls 156 and 157. Thus, as these two webs are separately guided into their respective feed rolls, they are caused to be stripped apart and effect a transfer in the manner described above whereby complementary images are formed on the respective webs.

In the meantime, plate 11, from which the powder image has been transferred, is caused to continue to be advanced between a pair of feed rolls 160 and 161 that pass the plate to a suitable dispensing location. Thereafter, each of the webs may be separately cut to remove the individual images thus formed or may be utilized continuously or otherwise as required.

By the description thus far, there is disclosed the simultaneous formation of complementary images formed simultaneously on webs 30 and 31. For forming negative image transparencies, web 30 is preferably of a transparent expendable type of material having a face either adhesively coated or capable of being rendered sufficiently adhesive to transfer the donor film from web 31. Where an adhesive tape is employed, the photoconductive layer supported on a xerographic plate from which the powder is to be transferred should be adequately bonded as not to be removed by the tape being stripped therefrom and may include reusable type plates such as those employing vitreous selenium as the photoconductor or such other commercially marketed plates as those employing zinc oxide in a suitable binder. It has been found, however, that the laboratory worker can readily develop techniques to strip the tape carefully without removing the photoconductive layer and the fact that the photoconductor can be stripped when care is not exercised is not intended as a limitation on the bonding required.

Obviously many materials having various orders of suitability are commercially available or can be adapted for the role of web 30. For transparency formation, polyester film Mylar backed tapes have exhibited greater strength and greater dimensional stability than either acetate or cellophane although all have been employed in successfully carrying out the invention. Available commercial forms of masking tapes were found suitable for low resolution reproduction not requiring transparency. Desirably, the tape should have an adhesive layer capable of complete toner removal from the photoconductor without flowing through or around the toner material if an adhesive web is being employed so that the image areas will prevent stripping of the donor film or layer. At the same time if an adhesive web is used, adhesion must be adequate for substantially complete removal or stripping of the donor film from the donor web 31 during this manipulation.

As a general matter, the main control on the resolution of images formed is the resist image. Any image capable of comprising a resist against donor transfer can be employed. When employing xerography for forming the graphic or resist image, the developer, its particle size if of powder, its fidelity, and the like, affect ultimate resolution. Generally, it has been found that no perceptible loss of resolution results because of the additional steps of this invention. However, it should be appreciated, as a lens can affect quality in a projection of an image, it is believed that the other steps of this invention may slightly deteriorate quality in the images produced. Whether or not this is so, ultimate quality is defined by the quality of the resist image, itself. With cascade carrier type development, for example, image resolution of 120 line pairs/mm. have been obtained. In order to accomplish this, it became necessary to use small size toner particles. To effect quality development in a cascade system, it was also found desirable to use small carrier particles. It is basic to the cascade system that in a given mass of carriers, the number of carriers are a cube function of their size in a load of developer for a given amount of toner. The significance of this is that as developer cascades over the plate surface, the number of contacts to a given area increases greatly with a decrease in carrier diameter. This factor together with the fact that such a relationship between toner and carrier exists allows the toner to deposit more easily and to recognize the charge being developed. Carriers of about .003 inch to .005 inch in diameter have been proven compatible in producing image resolutions of 120 line pairs/mm. and the toner in such a developer was a micron or less in size. The use of powder cloud or liquid development systems are capable of producing higher resolution images and thus may be employed where resolutions in excess of about 100 line pairs/mm. are desired.

Ultimate resolution in a particle developing system is the individual particle size. As should be apparent for high resolution, uniformity in particle size is also necessary. In addition, low density developments are desired in a high resolution system since with higher densities toner tends to pile in development such that for fine lines, small particle sizes are needed to avoid line spreading Where resolution is not a consideration, particle size is not a critical factor but is dependent on ultimate use requirements. For example, 40 line pairs/mm. resolution cannot be consistently resolved by particles on the order of 10 to 12 microns but if lower resolution is acceptable, larger particles may be used. Desirably for high resolution, the particles should be about ⅓ to $\frac{1}{10}$ the size of the narrowest line to be resolved and image density in development should comprise piling not more than 1 to 1½ particles high.

To assure maintenance of resolution when the developed image is transferred in a high resolution system employing adhesive type transfer techniques, a "hard" adhesive should be employed with a "low quick tack." Such a material is a pressure sensitive adhesive with a high creep resistance and about a three-pound peel strength per inch of width as measured when being removed from polished stainless steel at 72° F. employing a 180 degree peel angle at the rate of four feet per minute. This class of adhesiveness is not intended herein as a definition of operability limits or as defining criticality but is included for purposes of providing complete disclosures. Operability in a practical sense is a function of the image resolution desired and resolution as is now apparent will depend on many factors. Materials found suitable include cellophane tapes, masking tapes, household adhesive tapes including friction tapes, supports coated with a tacky layer such as rubber cement, and the like.

Web 30 may also comprise dye transfer paper or a polyethylene sheet. To accomplish transfer to dye transfer paper, the paper is wetted and then pressed against the image bearing surface. This transfer technique is fully described in Andrus, U.S. Patent 2,843,499 and reference should be made thereto for additional details. The polyethylene transfer technique involves the use of a prepared sheet fully described in U.S. 2,855,324 which is pressed against the image surface as described in this same patent.

As has been pointed out previously, transfer of the image may also be employed which is not dependent on adhesiveness or the like in the transfer web. Thus one may use conventional electrostatic transfer techniques or the like to any of various known ordinarily used transfer surfaces.

Also has been noted previously, the object of forming a resist can readily be accomplished by forming the resist as through stenciling techniques or the like directly on the web member or even on the donor layer. In this embodiment of the invention, xerography or related systems need not be used.

The donor film or layer 33 and its support base 32 likewise play an important role in the instant process and these should include appropriate properties compatible with the other materials being used. The film or layer 33 produces better quality images if uniform. This is more readily accomplished if the base presents a smooth surface for the film. In addition, if high image resolution is of interest, support layer 32 should preferably be a relatively thin flexible section on the order of about .001 inch or less. Flexibility in support 32 allows the donor film to flow about the image and thinness in this layer also is of value in making the contact complete. For images having relatively low resolution, films of ⅛ inch thickness have been used. It should, of course, be appreciated that support 32 need not be a thin layer but may comprise a solid member such as wood, plastic elements, metals or the like. If support 32 is not transparent as when a thick metal member is employed, the image produced should contrast with the surface for reading purposes.

The internal bond of the donor film should be great enough to permit complete stripping of the film from the base. Additionally, the base material should offer a bond to the donor film of a force greater than the transverse internal bond or strength of the film. Preferably, the base should be of an expendable material, although reusable materials such as various forms of glass and metals are not excluded and are of value for particular applications. Polyester films have been found to work well as the base due to their general utility, dimensional stability and high strength. They are also of value because of their transparent qualities.

The opaque donor film or layer 33 contained on base 32 should be adequately and uniformly opaque throughout and at the same time, desirably ought to be uniformly releasable to adhesives employed. Evaporated metal coatings of antimony, aluminum and silver have exhibited properties suitable for the process hereof as well as particulate dispersions.

In the usual form of the invention as carried out, it was found that opaque particulate dispersion, dispersed in a thin, uniform film coated onto the base performed very effectively. Electrophoretic deposition gave controlled uniform thicknesses with good adhesive retention. Ordinarily, dispersing agents such as Tannin, or sulfonated oils as low as 0.1 percent by weight are useful to maintain the particles in suspension and to provide adequate bond between particles. The binder need only be sufficient to cement the material and not to provide continuity. Bonding may also be enhanced by incorporating from about 0.5 percent to about 20 percent by weight of a plastic material such as acrylics, polystyrenes, methylates, etc. Graphite and carbon blacks are ideal pigments due to their fine particle size and opacity but most other pigments will operate. Various dag suspension forms of the Acheson Colloids Co., have worked well. Metal powders and pigments such as iron oxide and zinc chromate as well as colloidal suspensions of magnesium and chromium have worked well. Where the donor film is of a conductive material, it can be utilized as a printed circuit or circuit board as is well known in the art. Also one can use a dyed binder alone or if chemical reactions are built into the other elements, as through the use of color causing reacting toner or support base in the image material or its carrier surface, one need not use colored or opaque material in the donor film or layer 33.

Thickness of the donor film is not considered critical and is largely a function of resolution to be attained. Generally thickness ranges from about .0001 inch to produce about 70 line pairs/mm. and above and to about .0003 inch and over for 40–50 line pairs/mm. However, operable films have been prepared ranging down to 1000 angstroms employing evaporated metal coatings and up to .001 inch thickness for particulate film from which fine results have been attained. Still thicker films on the order of 1/16 of an inch have been employed for applications in which high resolution is not a primary consideration as in the preparation of braille images and, of course, still thicker films or layers may be used.

In accordance with the invention, the developed image need not be highly legible or even legible at all, it being sufficient that it afford resistance to donor transfer. By this means, a thin low contrast developed image can be utilized to produce a high contrast reproduction such as a transparency. In effect, the process of the invention achieves a quantum gain in photographic speed or sensitivity over conventional line copy reproduction by its ability to convert a low density, low contrast image to one of high density and high contrast. Gains of 4 to 1 have been general and gains of 10 to 1 have been achieved.

The following exemplifies in a preferred embodiment the process of the invention for application of forming complementary and simultaneous reproductions of positive and negative projection transparencies. Toner of about 3/4 to 1 micron and with an absence of pigment material was employed with about 100 micron carriers to cascade develop a high resolution image on a 10 micron or 20 micron vitreous selenium photoconductor supported on a brass substrate. Exposure of the plate was about 1/3 of that used in conventional commercial xerographic equipment using selenium layers. The developed image was adhesively transferred to an adhesive tape, of a type commercially marketed by the Minnesota Mining and Manufacturing Company, as brand 853 Mylar tape. For transfer, the tape was applied firmly and adhesive side down against the developed image and then tangentially peeled off. To assure uniform contact the tape was rolled with a roller against the selenium surface. A donor film had been formed on a 1/2 mil Mylar base by dip coating thereon a colloidal suspension of graphite in a solvent with a dispensing or binding agent of a type marketed commercially as dispersion No. 154, by the Acheson Colloids Company. The tape bearing the resist images was then rolled against the donor film. The tape was then stripped producing as illustrated in FIG. 8, a negative image transparency on the adhesive tape and a positive image transparency on the donor base, each having image resolutions on the order of 120 line pairs/mm.

By the above specification, there has been described a novel method of image reproduction capable of wide latitudes of sensitivity, fidelity as well as utility. By virtue of the quantum gain benefits, images of low light intensity can be transformed into high density reproductions. By a proper choice of materials, extremely high resolution images can be attained. In addition, donor films such as the particulate dispersion described above are characterized by clean, sharp breaks giving sharp edges and corners. The abrupt transition, as compared to prior art techniques in which the transition has associated bleeding between colors, results in extremely high definition. With this control over resolution as well as high definition, it has been found possible to produce high quality half-tone reproductions. In addition, since very high resolution is possible, continuous tone renditions are producible. In effect following the teachings of the instant invention and employing high resolution half-tone processes, one approaches grain size as found, for example, in high quality photographic systems to result in high quality continuous tone renditions.

In addition, the process lends itself not only to forming black and white image transparencies but also to multicolor transparencies.

It is not intended that size of the formed transparencies be in any way limited. Rather, the ultimate size can be a function of the requirements for the application and may include magnification changes between the original and final reproduction producing microimages or extreme enlargements. It is further not intended to be limited to any named materials since any suitable material combinations according to the results to be obtained in accordance with the description of the invention are intended to be encompassed herein. Whereas high resolution reproduction has been distinctly emphasized as an advantage of the instant invention, it should be apparent that the scope of the invention is much broader and diverse.

Since many changes can be made in the above construction and many apparently widely different embodiments of this invention could be made without departing from the scope thereof, it is intended that all matter contained in the drawings shall be interpreted as illustrative and not in a limiting sense.

What is claimed is:

1. The process of forming image reproductions comprising in sequence the steps of:

(a) presenting an adhesively tacky support base surface bearing a resist image into contact against a second support base containing a releasable uniform surface film separable selectively by area subjected to adhesive attraction; and, (b) separating said support bases from each other whereby said film from said second support base is released to said first support base in the surface areas devoid of the resist image.

2. The process according to claim 1 in which said surface of the first support base is rendered tacky prior to contact with said second support base.

3. The process according to claim 1 in which the releasable surface film on said second support base comprises a metallic film.

4. The process according to claim 1 in which the releasable surface film on said second support base comprises a colloidal suspension of material in a solvent.

5. The method of forming a reproduction comprising in sequence the steps of:
(a) creating a resist image on a support surface;
(b) pressing the support surface bearing the resist image against a uniform donor member having a releasable donor surface separable selectively by area subjected to adhesive attraction and positioned facing said support surface, said support surface, said donor surface and said resist image being characterized to cause adhesion of said donor surface to said support surface in areas of contact therebetween and non-adhesion in areas of contact between said resist image and said donor surface:
(c) separating said donor member from said support surface causing transfer of said donor surface to said support surface in areas of adhesion forming an image configuration of the remaining of said donor surface on said donor member conforming to areas of the resist image.

6. The process of forming image reproductions comprising in sequence the steps of:
(a) forming a loosely adhering resist image of original copy on the surface of a support base containing an adhesively releasable uniform surface layer separable selectively by area subjected to adhesive attraction;
(b) presenting a second support base having an adhesive surface into contact against the surface of the first support base containing the resist image; and,
(c) separating the support bases from each other whereby the resist image transfers to said second support base and a portion of said releasable layer on said first support base transfers to said second support base in areas thereon contiguous to the resist image.

7. The process of forming image reproductions comprising in sequence the steps of:
(a) forming a resist image of original copy on an adhesive surface of an adhesively releasable uniform surface layer on a support base from which the layer is separable selectively by area subjected to adhesive attraction;
(b) presenting a second support base into contact against the surface of the first support base containing the resist image; and,
(c) separating the support bases from each other whereby said releasable layer on the first support base adheres in the area devoid of said resist image to said second support base and is transferred thereto.

8. The process of forming image reproductions comprising in sequence the steps of:
(a) forming a removable graphic resist image of an original on a support surface;
(b) transferring the graphic image from its support surface to an adhesive surface of a first support base;
(c) presenting said adhesive surface containing the graphic image into contact against a second support base containing a releasable uniform surface layer separable selectively by area subjected to adhesive attraction; and,
(d) separating said support bases from each other whereby said layer from said second support base adhesively adheres and transfers to said first support base in the surface areas absent of a graphic image thereon.

9. The process of forming image reproductions comprising in sequence the steps of:
(a) forming an adhesively removable graphic resist image of an original on a support surface;
(b) applying an adhesive surface of a first support base against the graphic image on its support;
(c) removing said first support base from said last recited relation with the graphic image adhering thereto;
(d) presenting said adhesive surface containing the graphic image into contact against a second support base containing a releasable uniform surface layer separable selectively by area subjected to adhesive attraction; and,
(e) separating said support bases from each other whereby said layer from said second support base adhesively adheres and transfers to said first support base in the surface areas devoid of a graphic image thereon, to form image reproductions on each of said support bases complementary to each other.

10. The process according to claim 9 for forming an image projection transparency on said first support base wherein said first support base and the graphic resist image are of substantially transparent materials and said releasable layer is opaque.

11. The process according to claim 10 for simultaneously forming an image projection transparency on said second support base wherein said second support base is of substantially transparent material.

12. The process of forming image reproductions comprising in sequence the steps of:
(a) xerographically forming a resist transferable image of an original on a support surface;
(b) transferring said image from its support surface to an adhesive surface of a first support base;
(c) presenting said first support base supporting said image with the adhesive surface into contact against a second support base containing a releasable uniform surface layer separable selectively by area subjected to adhesive attraction; and,
(d) separating said support bases from each other whereby said releasable layer from said second support base adhesively adheres and transfers to said first support base in the surface areas devoid of said image thereon.

13. The process of forming image reproductions comprising in sequence the steps of:
(a) xerographically forming a resist transferable image of an original on a support surface;
(b) applying an adhesive surface of a first support base against the image on said support surface;
(c) removing said first support base from said last recited relation with the image adhering and transferred thereto;
(d) presenting said first support base supporting the resist image with the adhesive surface into contact against a second support base containing a uniform releasable opaque surface layer separable selectively by area subjected to adhesive attraction; and,
(e) separating said support bases from each other whereby said opaque layer from said second support base adhesively adheres and is transferred to said first support base in the surface areas devoid of the resist image thereon.

14. The process according to claim 13 in which the xerographic formation of the resist image includes cascade development with a two-component developer of carrier and toner.

15. The process according to claim 14 in which the toner component has a dimension approximately ⅓ to $\frac{1}{10}$ the width of the minimum image area to be reproduced.

16. The process of forming image reproductions comprising in sequence the steps of:
(a) applying a uniform charge onto the surface of a xerographic plate;

(b) exposing the charged plate to activating radiation of an original image to form an electrostatic latent image of the original on the plate surface;

(c) developing the electrostatic latent image with a transferable electroscopic powder to an image density as low as one tenth the xerographic standard;

(d) transferring the powder image to an adhesive surface of a first support base;

(e) presenting said first support base supporting the powder image with the adhesive surface into contact against a second support base containing a uniform releasable surface film separable selectively by area subjected to adhesive attraction; and, (f) separating said support bases from each other whereby said surface film from said second support base adhesively adheres and transfers to said first support base in the surface areas devoid of powder image thereon.

References Cited by the Examiner

UNITED STATES PATENTS

| | | | |
|---|---|---|---|
| 2,700,930 | 2/1955 | Hennigsgard | 101—128.2 |
| 2,721,817 | 10/1955 | Hastings et al. | 156—241 |
| 2,796,374 | 6/1957 | Donahue | 156—241 |
| 2,949,849 | 8/1960 | Gundlach | 117—17.5 |
| 2,955,531 | 10/1960 | Bogdonoff | 117—17.5 |
| 2,990,278 | 6/1961 | Carlson | 117—17.5 |
| 3,091,528 | 5/1963 | Buskes | 96—33 |
| 3,091,529 | 5/1963 | Buskes | 96—28 |
| 3,093,068 | 6/1963 | Gundlach et al. | 96—1 |
| 3,181,462 | 5/1965 | Newman | 96—28 |

OTHER REFERENCES

"The Focal Encyclopedia of Photography," vol. 2 (1958), pages 759, 767.

NORMAN G. TORCHIN, *Primary Examiner.*

A. LIBERMAN, D. D. PRICE, *Assistant Examiners.*